Nov. 4, 1969 C. L. BOICE ETAL 3,476,873

METHOD OF AND APPARATUS FOR REPRODUCING SIGNALS RECORDED ON MAGNETIC TAPE WITH HEAD SWITCHING MEANS

Filed Dec. 22, 1965 4 Sheets-Sheet 1

INVENTORS
CLARENCE L. BOICE
JOSEPH STEVENS ALLEN
BY Paul B. Fihe
PATENT AGENT

METHOD OF AND APPARATUS FOR REPRODUCING SIGNALS RECORDED ON MAGNETIC TAPE WITH HEAD SWITCHING MEANS

Filed Dec. 22, 1965 4 Sheets-Sheet 2

INVENTORS
CLARENCE L. BOICE
JOSEPH STEVENS ALLEN
BY Paul B. Fihe
PATENT AGENT

INVENTORS
CLARENCE L. BOICE
JOSEPH STEVENS ALLEN
BY Paul B. Fihe
PATENT AGENT

INVENTORS
CLARENCE L. BOICE
JOSEPH STEVENS ALLEN
BY Paul B. Fihe
PATENT AGENT

United States Patent Office 3,476,873

Patented Nov. 4, 1969

3,476,873

METHOD OF AND APPARATUS FOR REPRODUCING SIGNALS RECORDED ON MAGNETIC TAPE WITH HEAD SWITCHING MEANS

Clarence L. Boice, San Jose, and Joseph Stevens Allen, Atherton, Calif., assignors to Allen Electronics, Inc., Palo Alto, Calif., a corporation of California Filed Dec. 22, 1965, Ser. No. 515,650
Int. Cl. H04n 5/78
U.S. Cl. 178—6.6 8 Claims

ABSTRACT OF THE DISCLOSURE

Disclosed herein are circuits for increasing the quality of video signals derived from magnetic tape by masking switching transients due to changes among the transducers of the tape playback head. Switching between transducers is controlled by generating timing pulses which assure that one transducer is in established contact with the tape before the preceding transducer is switched out of the reproduction circuit.

Figure 1:
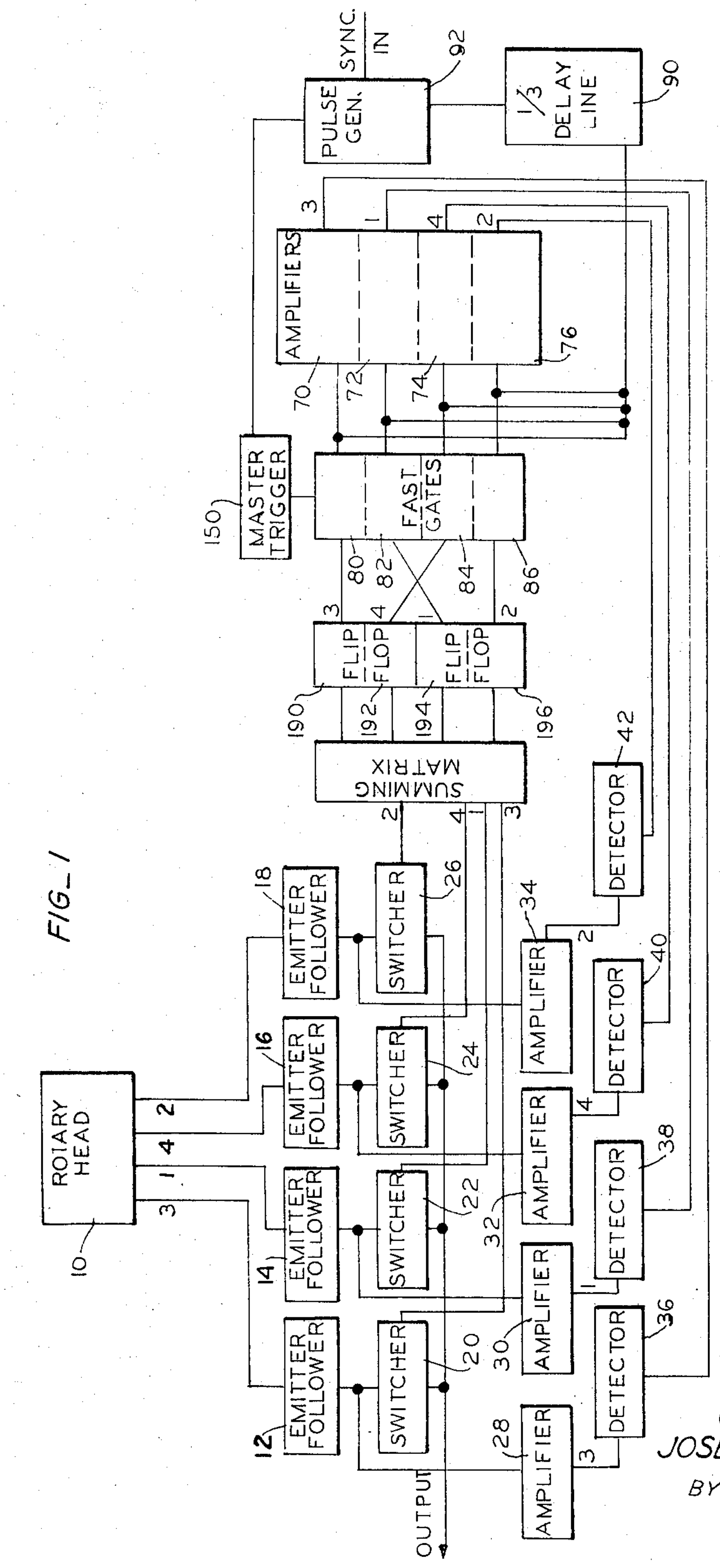

The present invention relates generally to magnetic tape recording systems and more particularly to a method of and apparatus for reproducing information recorded on magnetic tape.

While obviously not restricted in its application, the present invention is designed primarily to circumvent certain problems encountered in the reproduction or "playback" of video signals recorded on magnetic tape. Commonly, a transducer in the form of a rotary head assembly having four quadrantal segment magnetic heads is arranged to move transversely across a moving magnetic tape both for purposes of recording an input signal on the tape and for subsequently reproducing such signal. More particularly, the tape contacts the head assembly for approximately 120° and, as a consequence, before one of the heads loses contact with the tape, another head comes into contact therewith so that an overlap of the recorded or reproduced information occurs. In the reproduction process, it is conventional to provide for switching the reproduced signal input from one head to another during this period of overlap and concerted attempts have been made to synchronize such switching action with the so-called blanking intervals at the end of each horizontal video line upon the television receiver. Most commonly, such switching is controlled in response to the arrival of the rotary head at a particular position as sensed by a photoelectric cell. However, this or other less commonly used switching techniques have not always achieved the desired synchronism and switching transients appear frequently upon the screen of the television receiver in the form of small white dots.

Accordingly, it is a general object of the present invention to provide a method of and apparatus for reproducing information signals recorded on magnetic tape which ultimately increases the quality of the reproduced signal information.

More particularly, it is a feature of the invention to provide a method of reproducing information recorded on magnetic tape which controls the switching of signal information in a fashion so as to enhance the quality of the reproduced signal information.

Additionally, it is a feature of the invention to provide a method wherein the switching is achieved in a fashion to greatly reduce the duration of switching transients and consequently any deleterious effects resulting therefrom in the entire reproducing equipment.

Another feature of the invention to utilize the signal information received from the magnetic tape as its own timing reference for control of the switching operation, thus enabling precise predictability of the switching interval so that it in turn can be made to correspond to the blanking interval of the video signal.

Yet more particularly, it is a feature of the invention to control the switching operation in response to the signal information received from the tape and to delay the switching operation a predetermined period after the beginning of signal reception so as to effect transmission of only high fidelity information to the utilization circuit.

Quite specifically, it is a feature of the invention to normally control the switching operation with a precisely timed synchronizing pulse but to delay the switching until the tape head has established good contact with the tape, a delay of one-third picture line being typical.

In the event that the synchronizing pulse is inoperative, it is an additional feature of the invention to provide for instigation of the switching operation in response to a delayed pulse derived from the radio-frequency signal itself.

It is a particular feature of the invention to develop a delay pulse from the received signal information utilizing a detector arrangement which discriminates against spurious signals below a predetermined amplitude.

Very generally, the method of the present invention enabling the reproduction of information previously recorded on magnetic tape includes, as an initial step, the derivation of the recorded information signal from such tape. A time reference signal is provided in controlled response to the reception of the information signal and this time reference signal is in turn utilized to control the transmission of the information signal through the main utilization or reproduction circuit of the reproduction system.

More particularly, when applied to the reproduction of video information signals wherein a sequence of overlapping signals are derived from tape by a four-magnetic head rotary head assembly, the sequentially related, four signals are separately detected and thereafter separately utilized to provide trigger pulses which are delayed in time sufficiently to assure that each head on the rotary head assembly has attained good contact with the magnetic tape wherefore high fidelity of the information signal has been attained. These trigger pulses are thereafter utilized to switch the transmission of the separate video information signals derived from the four magnetic heads in sequence as continuous radio frequency signals through suitable amplification and demodulation apparatus thus to complete the reproduction process.

Figure 2:
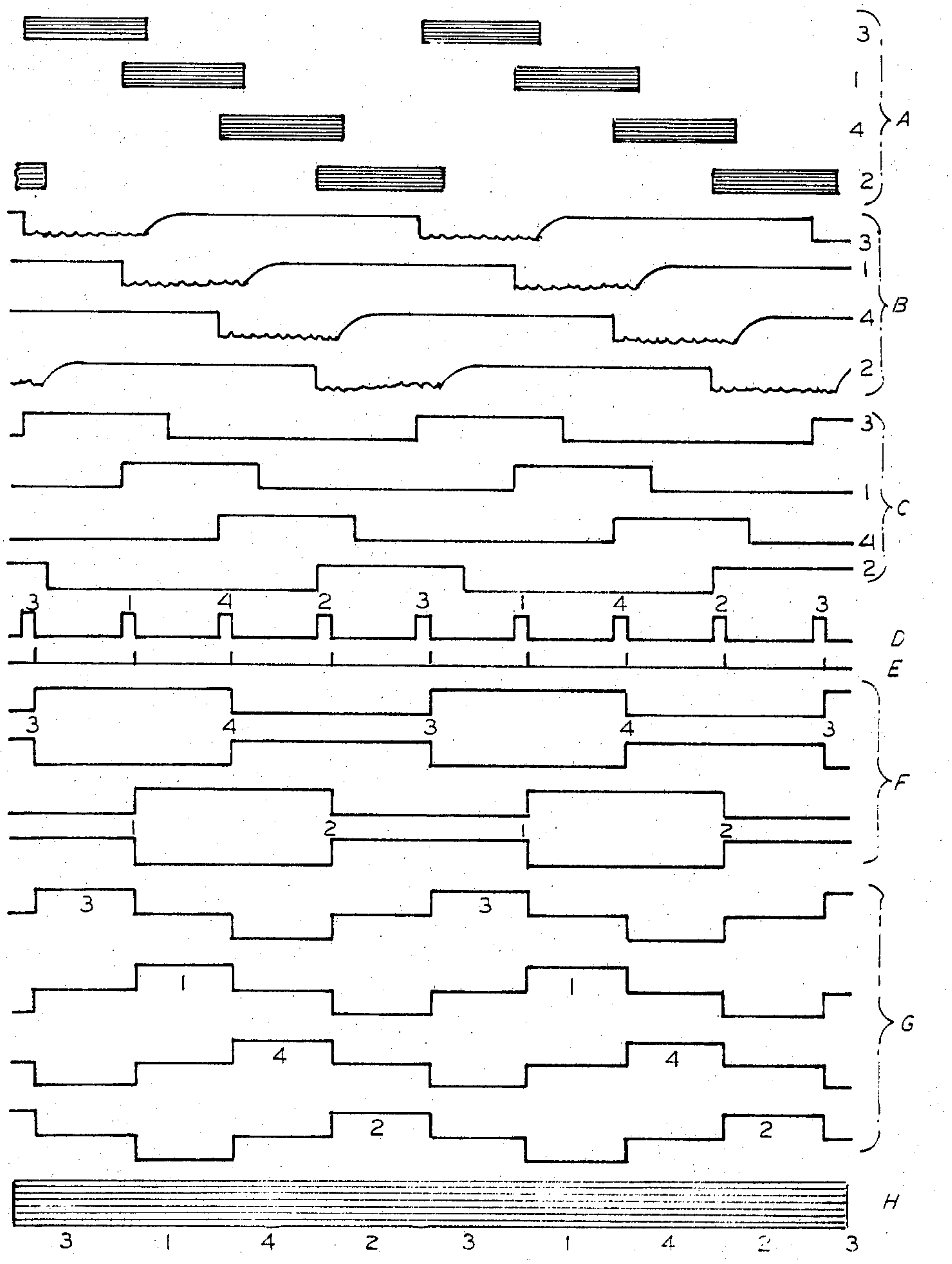
Figure 4:
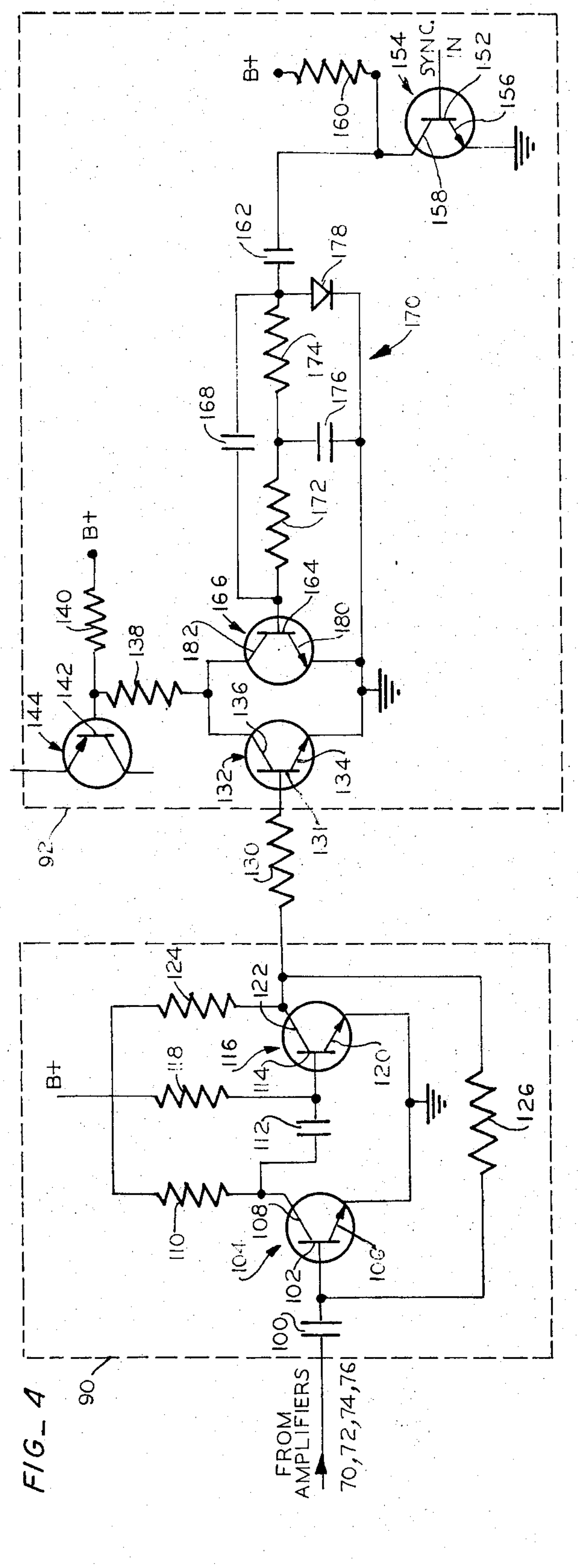
Figure 3:
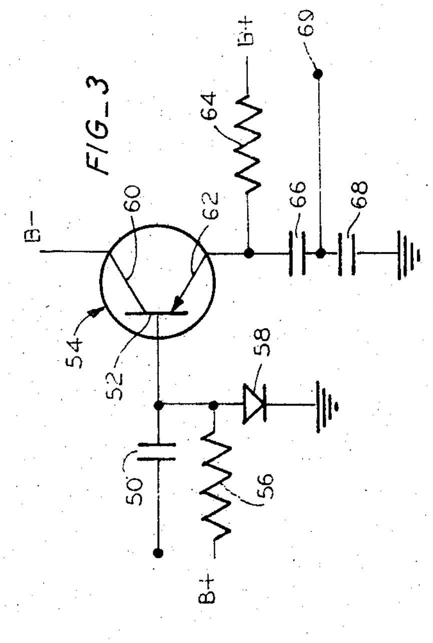
Figures 5, 6:
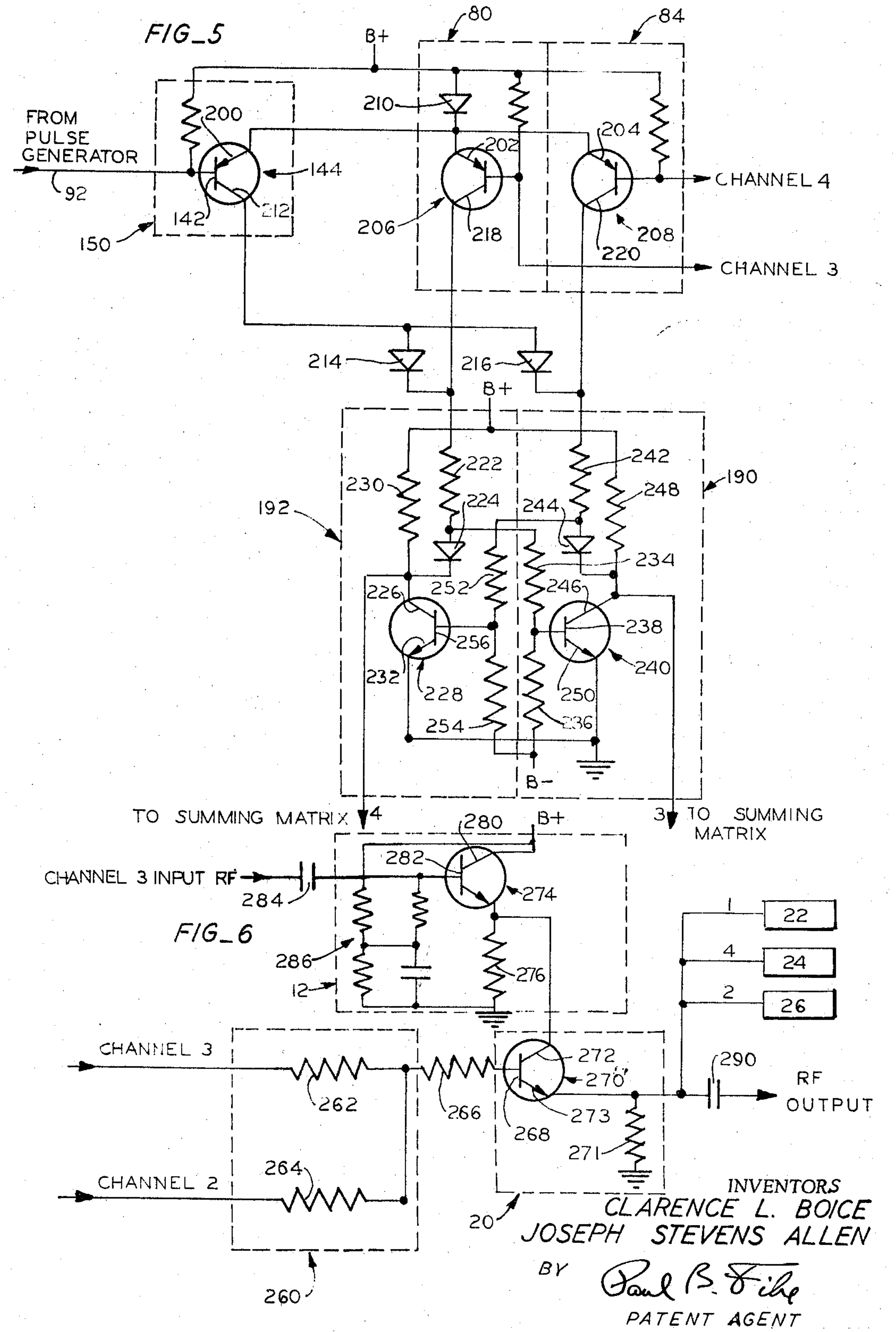

Details of the method will be more readily understood by reference to the following description of the exemplary apparatus for carrying out the method shown in the accompanying drawings wherein specifically:

FIG. 1 is a simplified block diagram of an exemplary apparatus for carrying out the method as generally described hereinabove, FIG. 2 is a graph illustrating the timed relationship of signals appearing at various stages in the operation of the illustrated apparatus, FIG. 3 is a simplified circuit diagram of an amplitude-discriminating detector forming part of the circuit, FIG. 4 is a simplified circuit diagram of a time-delayed pulse generator portion of the circuit generally shown in FIG. 1, FIG. 5 is an additional circuit diagram of a pulse-controlled flip-flop circuit constituting another portion of the circuit generally shown in FIG. 1, and FIG. 6 is a further circuit diagram showing details of a switcher portion of the circuit.

With initial reference to FIGS. 1 and 2, a rotary head assembly 10 including four quadrantal segment magnetic heads as conventionally utilized in video recording equipment for transducing information to and from the magnetic tape, is connected to deliver four separate information signals to four separate circuits. These four information signals constitute radio frequency signals varying in frequency in accordance with the modulation corresponding to the recorded information and are respectively denomminated as channels 3, 1, 4, and 2. The signals are sequentially spaced as shown in the upper A portion of FIG. 2, with the trailing portion of the information signal derived from one head terminating after information is being received by the succeeding head, such overlapping of the sequential signals being standard practice as mentioned hereinbefore. As will be obvious, the graphical representation of the sequentially related overlapping signals in FIG. 2 represents two revolutions of the rotary head 10.

The sequential signals from channels 3, 1, 4, and 2 are respectively delivered to similar emitter followers 12, 14, 16, 18, each of which utilizes an NPN transistor connected as shown in FIG. 6 and to be described in detail hereinafter. It may be mentioned at this point that substantially all of the circuitry utilized in the apparatus is preferably transistorized although vacuum tube circuitry could obviously be substituted therefor if desired.

The output radio frequency signals from the emitter followers 12, 14, 16, 18 are delivered both to the main reproduction circuit and also to individual bypass control circuits, transmission to the main circuit being controlled by electronic switchers 20, 22, 24, 26 whose operations are controlled by reference signals developed in the bypass circuits as will be explained in detail hereinafter. Generally, the four electronic switchers 20, 22, 24, 26 are rendered sequentially operative to transmit the respective input signals from the emitter followers and their outputs are tied together for common transmission through the main reproduction circuit wherein demodulation and amplification of the conjoined, substantially continuous signal information are achieved. Such additional reproduction circuitry is not illustrated since it can be of a conventional nature and forms no part of the present invention in and of itself.

The bypass circuits connected to the outputs of the respective emitter followers 12, 14, 16, 18 deliver sequential portions of the radio frequency signal initially to standard radio frequency amplifiers 28, 30, 32, 34 preferably utilizing PNP transistors and thence to detectors 36, 38, 40, 42 which detect the radio frequency signals to provide a series of output pulses corresponding in duration to the respective sequentially related radio frequency signals received from the rotary head. Preferably, each detector incorporates an automatic level control mechanism whose operation will be more clearly understood by reference to FIG. 3 which constitutes a simplified circuit diagram of an individual detector.

As shown in FIG. 3, the input radio frequency signal from one amplifier 28 is delivered through a coupling condenser 50 to the base 52 of a PNP transistor 54 (e.g. 2N706). The base 52 is connected to B+ through a resistor 56 and is also tied to ground through a diode 58 connected so that the base can be driven by the input signal only negatively relative to ground potential. The collector 60 is connected to B− and the emitter 62 is in turn connected to B+ through a resistor 64 and through two condensers 66, 68 to ground, the output signal pulse being delivered at a connection 69 intermediate these condensers. Conjointly the resistor 64 and the two condensers 66, 68 form an RC circuit whose time constant is relatively long at the normal operating frequencies so that the condensers and particularly condenser 68 cannot fully discharge between individual cycles of the radio frequency input wherefore ultimately the envelope of the incoming RF signal is detected and delivered to the output connection. More particularly, the relatively slow discharge of the condensers 66, 68 in the emitter circuit allows the transistor 54 to conduct only on the negative peaks of the input signal. Typically, the input RF signal has a peak to peak swing of approximately four volts which is of course negative since the base 52 is tied to ground through the diode 58, and the recovery time of the RC circuit is such that conduction of the transistor 54 occurs only when the input signal has a negative potential greater than 3.5 volts. Accordingly, all spurious responses received at the detector input, either during the delivery of radio frequency energy thereto or during the times when other tape heads are in contact with the tape and as a consequence no radio frequency signal is being derived at this particular detector, are obliterated. Since most spurious responses do not attain a four volt amplitude and are accordingly discriminated against by the illustrated detector, ultimately no inadvertent switching will occur. The output pulse delivered from the level-discriminating detector ultimately constitutes a negative pulse substantially equal in length to that derived from the tape by the respective associated magnetic head with a relatively abrupt leading edge, a slight variance in amplitude depending upon the time constant of the described RC circuit and a sloping, trailing edge which is also determined by such RC circuit, all as indicated at the B portion of FIG. 2.

The negative pulses of slightly varying amplitude from the detectors 36, 38, 40, 42 are thereafter delivered to respective amplifiers 70, 72, 74, 76 of a generally conventional nature but which are overdriven so as to produce output pulses which are positive and of substantially constant amplitude as indicated in portion C of FIG. 2. These positive output pulses are delivered directly to corresponding fast gates 80, 82, 84, 86 which are also supplied at intervals with a trigger pulse constituting a time reference signal.

As generally shown in FIG. 1, the time reference signal is developed in a by-pass circuit which includes a time-delay circuit 90 that receives the conjoined sequential pulses from the amplifiers 70, 72, 74, 76 and delivers a series of corresponding output pulses having a width of preferably one-third of a single picture line, as shown in the D portion of FIG. 2, to a pulse generating circuit 92 which also receives as a second input a series of synchronizing signals spaced at intervals equivalent to the length of one picture line. Typically, eighteen (18) synchronizing signals are supplied during the period of contact of one rotary head segment with the tape. Under normal operating conditions, the delay pulse essentially disables the pulse generator 92 for its duration wherefore the trigger pulse emanating from the pulse generator circuit cannot be delivered to the mentioned fast gates 80, 82, 84, 86 until a time when at least one-third of a picture line has passed after the initial establishment of contact between the individual rotary head and the magnetic tape.

This general functional description can be more readily understood by reference to the simplified circuit diagram of the time-delayed pulse generator portion of the circuit shown in FIG. 4. Each of the sequentially related positive pulses from the overdriven amplifiers 70, 72, 74, 76, as illustrated in the C portion of FIG. 2, are delivered in a common circuit through a condenser 100 to the base 102 of an NPN transistor 104 whose emitter 106 is grounded and whose collector 108 is tied to B+ through a load resistor 110. In turn, the collector 108 of the transistor is tied by a condenser 112 to the base 114 of a second transistor 116 which is also tied to B+ through a resistor 118 of predetermined resistance value. The emitter 120 of the second transistor 116 is also grounded and its collector 122 is tied through a load resistor 124 to B+. Additionally, the collector 122 of the second transistor 116 is connected through a feedback resistor 126 to the base 102 of the first transistor 104.

Normally, before the arrival of the pulse at the first transistor 104, the second transistor 116 is conducting so that its collector 122 resides at substantially ground potential and, in turn, the base 102 of the first transistor 104 is also at ground potential because of the connection through the mentioned feedback resistor 126 wherefore such first transistor is normally nonconducting. When one of the pulses arrives from one of the overdriven amplifiers, a differentiation occurs across the input condenser 100 so that a positive spike is applied to the base 102 of the first transistor 104 which, in turn, conducts so that its collector potential goes to ground potential wherefore a negative spike is applied across the coupling condenser 112 to the base 114 of the second transistor 116. As the base 114 of the second transistor 116 is driven negatively, it is cut off so that its collector potential rises rapidly to a positive value. Subsequently, the negative pulse applied across the coupling condenser 112 between the two transistors starts to swing positively as the condenser discharges through the associated resistor 118 connected to B+. At a certain time determined by the capacitance and resistance values of the condenser 112 and resistor 118, the base potential of the second transistor 116 will rise sufficiently to permit reestablishment of conduction therehtrough whereupon the collector potential is substantially instantaneously dropped to its original value. Thus, a positive, substantially rectangular pulse is delivered to the output of the described delay circuit 90 and the RC values are chosen preferably so that the duration of this pulse is equivalent to approximately one-third of a picture line.

The delay pulse is delivered through a resistor 130 to the base 131 of an NPN transistor 132 whose emitter 134 is tied to ground and whose collector 136 is connected through two series resistors 138, 140 to B+, the juncture between such two resistors being tied to the base 142 of another transistor 144 which forms the master trigger 150 (see FIG. 1) and whose operation will be described in more detail hereinafter.

The described connection of the delay pulse to the master trigger 150 controls actuation of the latter normally in response to a synchronizing signal which is supplied to the equipment in the form of a rising potential pulse or other wave form. More particularly, the synchronizing signal is supplied to the base 152 of a normally conducting NPN transistor 154, as shown in FIG. 4, whose emitter 156 is tied to ground and whose collector 158 is connected to B+ through a load resistor 160. The transistor output is delivered across a condenser 162 whereat a series of negative spikes are developed at intervals equivalent to one picture line, the width of each spike being approximately two microseconds. The negative spikes from the condenser 162 are connected through parallel paths to the base 164 of another transistor 166, one path being direct through a condenser 168 so that current flow through the transistor 166 is cut off upon the arrival of each spike, the second path comprising a biasing network 170 which normally maintains the base 164 of the transistor 166 at approximately .6 volt so that it will conduct between application of the negative spikes. More particularly, this network includes a pair of resistors 172, 174 connected in series to the base 164 of the transistor 166, the juncture of the resistors being tied to ground by a condenser 176 and the terminal of the resistors remote from the transistor base 164 being connected to ground through a diode 178 which conducts only in the direction toward the grounded terminal. The condenser 176 is accordingly charged and discharged periodically so that the mentioned .6 volt is maintained on the base 164 as an average potential between application of the negative spikes thereto. The emitter 180 of the transistor 166 is grounded and its collector 182 is, in turn, connected to B+ through the two previously described resistors 138, 140 so that in effect this transistor 166 is connected in parallel with the previously described transistor 132 to whose base the delay pulse is applied.

Accordingly, under normal operating conditions, the sequence of synchronizing signals supplied to the described transistor 166 maintain it normally in a conductive state through establishment of the .6 volt bias at its base 164 and in turn the base 142 of the master trigger transistor 144 is maintained at a potential such that it is normally conducting. When a negative synchronizing pulse arrives at the normally conducting transistor 166, it is cut off which, in turn, stops the flow of current through its collector circuit and the base 142 of the master trigger transistor 144 is raised to a potential above its emitter potential so that the master trigger transistor is cut off. If, however, a synchronizing pulse cuts off the transistor 166 while the parallel delay pulse transistor 132 is conducting because of the existence of the positive delay pulse on its base 131, the potential on the base 142 of the master trigger transistor 144 is retained at a level such that this transistor is not cut off, If, however, a synchronizing pulse cuts off the transistor 166 while the parallel delay pulse transistor 132 is conducting because of the existence of the positive delay pulse on its base 131, the potential on the base 142 of the master trigger transistor 144 is retained at a level such that this transistor is not cut off, thus enabling the action of the synchronizing pulse and precluding further circuit actuation in a manner to be explained hereinafter. In the E portion of FIG. 2, synchronizing pulses are shown in operative positions following the end of the delay pulses shown in the D portion of FIG. 2. Other synchronizing pulses exist at intervals of one picture line but do not effect the circuit and therefore are not illustrated. Actually, since the synchronizing pulses occur at intervals of one picture line and the delay pulse disables triggering only during the first one-third picture line of received information, the triggering can occur immediately after the delay pulse as depicted in FIG. 2 so as to be delayed one-third picture line or can be delayed up to but not including one and one-third picture lines in the case where one synchronizing pulse is disabled immediately prior to the end of the delay pulse and the next and operative synchronizing pulse does not occur until slightly less than one and one-third picture line of information has been received. Accordingly, the circuit permits adjustment of the timing of the synchronizing signal as required, for example, to perform the switching function during a blanking interval at the end of a video picture line.

In the event that the source of synchronizing pulses is inactive, the associated control transistor 166 will not be conductive and a positive pulse sufficient to cut off the master trigger transistor 144 will be applied to its base 142 only at the terminal end of the delay pulse and such cut off will again trigger operation of the circuit. In other words if the source of synchronizing pulses is inactive, operation of the switching circuit is self-synchronous. Transistor 166, normally biased in a conductive state by the synchronizing signals, is cut off on the arrival of a synchronizing pulse, thereby driving off the master trigger transistor 144. In the absence of such bias from synchronizing signals the transistor 166 will be off but the master trigger transistor 144 will conduct until the end of a delay pulse whereupon the transistor is cut off, again synchronizing operation of the switching circuit. While it is of course preferred to utilize synchronizing signals, it will be seen that the circuit remains operative even though such synchronizing signals are not present. Since the delay pulse is, as previously described, preferably one-third picture line in duration and functions to disable the synchronizing signal during this period, the master trigger 150 cannot be actuated until at least one-third picture line delay has been experienced after initial contact between the tape head and the tape.

Actuation of the master trigger 150 in the fashion described is conjoined with actuation of the previously mentioned four fast gates 80, 82, 84, 86 which are generally connected in two substantially equivalent pairs to control respectively the "on" and "off" conditions of a pair of flip-flop circuits 190, 192 and 194, 196. With continued reference to FIG. 1 and supplementary reference to the detailed circuit diagram of FIG. 5, the circuit arrangement of the master trigger 150 in conjunction with two of the fast gates 80, 84 which receive the channel 3 and channel 4 inputs from the amplifiers to control the alternate conduction of two parts 190, 192 of a single flip-flop circuit will be described, it being understood that the other two fast gates receiving the channel 1 and channel 2 inputs similarly control in conjunction with the master trigger 150 the operation of the other pair of flip-flops including parts 194 and 196.

With detailed reference to FIG. 5, the master trigger transistor 144 whose base 142 receives the positive delayed pulse is a PNP transistor whose emitter 200 is commonly connected to the emitters 202, 204 of two additional PNP transistors 206, 208 which form the mentioned fast gates 80, 84. The common emitter connection is connected through a diode 210 to B+ which conventionally is 8 volts so that considering the drop across the diode, the potential on the three emitters 200, 202, 204 is approximately 7.4 volts. The collector 212 of the master trigger transistor 144 is connected through parallel diodes 214, 216 to the collectors 218, 220 of the fast gate transistors 206, 208, the one fast gate collector 218 being connected through a resistor 222 and a diode 224 to the collector 226 of an NPN transistor 228 which forms one part 192 of the flip-flop circuit. The transistor collector 226 is also connected to B+ through a resistor 230 and its emitter 232 is grounded. At a point between the described diode 224 and resistor 222, a second parallel path to the fast gate collector 218 is established through two serially related resistors 234, 236 to B− which is typically −8 volts, the junction between these two resistors being connected to the base 238 of a second NPN transistor 240 forming the other part 190 of the flip-flop circuit.

In a similar fashion, the collector 220 of the second fast gate transistor 208 is connected through a resistor 242 and a diode 244 to the collector 246 of this second transistor 240 which collector is also connected through a resistor 248 to B+ and the emitter 250 of this transistor 240 is also grounded. In turn, a second path to B− is established from a point in the fast gate collector circuit above the described diode 244 through two series resistors 252, 254 whose junction is tied to the base 256 of the first transistor 228 of the flip-flop circuit.

One or the other of the flip-flop transistors 228, 240 is conducting at any particular time. If it is assumed that the transistor 228 on the left in FIG. 5 is conducting, the other transistor 240 will be nonconductive and the change of state of the two transistors will proceed in the following fashion. As a positive pulse burst is received from the channel 4 amplifier 74, the first fast gate transistor 208 will be cut off so that no current will be drawn in its collector circuit. However, at this time, the master trigger transistor 144 is still conducting so as to draw current through its collector circuit including the two series related resistors 252, 254 so as to maintain sufficient bias on the one flip-flop transistor 228 to maintain it in a conductive state. As soon as a positive pulse is received on the base 142 of the master trigger transistor 144, (delayed at least one-third picture line) the master trigger transistor will also be cut off so that no further current will be drawn through the series related resistors 252, 254 and the base 256 of the flip-flop transistor 228 will immediately drop to B− potential which is sufficient to cut off conduction through such transistor. Since cut off of this flip-flop transistor 228 opens the low resistance path to the collector 218 of the second or channel 3 fast gate, transistor 206, its collector current must flow through the series resistors 234, 236 connected to the base 238 of the other flip-flop transistor 240 to thus raise its base potential so that this transistor starts to conduct. Thus, a positive step appears at the collector 226 of the first flip-flop transistor 228 substantially simultaneously with a negative step at the collector 246 of the second flip-flop transistor 240. Such flip-flop condition remains until a channel 3 pulse burst is received from the amplifiers approximately 180° later in terms of rotation of the rotary head. At such time, the described action is reversed so that the second transistor 240 is cut off and the first transistor 228 is rendered conductive. The output pulse from the channel 3 and 4 flip-flops 190, 192 are accordingly as shown in the F portion of FIG. 2 and the correlated outputs of the channel 1 and channel 2 flip-flops 194, 196 are similarly derived and indicated in FIG. 2, such latter changes of state being displaced by substantially 90° of head rotation. It is to be expressly observed that the change of state of the flip-flop circuits is substantially instantaneous, a rise or fall time of eight nano seconds being typical and the outputs, as shown in the F portion of FIG. 2 are precisely rectangular wave forms.

The outputs of the flip-flops circuits 190, 192, 194, 196 are now combined in a summing matrix 260 in a manner such that a series of four sequentially related pulses are derived therefrom for subsequent transmission to the respective electronic swtichers 20, 22, 24, 26 previously mentioned. More particularly, the channel 3 and 2 outputs of the flip-flop circuits 190, 196 are conjoined in the summing matrix so as to produce a Channel 3 switching pulse, the channel 1 and 3 flip-flop outputs are combined to provide the switching pulse for channel 1, the channel 4 and 1 outputs are conjoined to provide the switching pulse for channel 4, and finally, the channel 2 and 4 outputs of the flip-flop circuits 196, 192 are conjoined to provide switching pulse for the channel 2 switcher. The summation pulses are illustrated in the G portion of FIG. 2, the positive operative portions being designated by the channel number.

Since each portion of the summing matrix 260 and its connection to the respective switcher is substantially identical, only one need be described and can be most readily understood by reference to FIG. 6 wehrein the control of the channel 3 signal information is illsutrated. The output of the channel 3 and channel 2 flip-flop circuits 190, 196 are joined by a voltage divider in the form of two resistors 262, 264 whose juncture is tied through another resistor 266 to the base 268 of the NPN switcher transistor 270. If the B+ potential of the flip-flop circuits is +8 volts, a +8 volts potential will appear at such juncture if and only if both the channel 3 and channel 2 flip-flop transistors are cut off.

The output of the switcher transistor 270 is developed across a load resistor 271 connected to its emitter 273 and its collector 272 is connected to the output of the emitter follower NPN transistor 274 which is developed across a load resistor 276 connected to its emitter 278. The collector 280 of the emitter follower transistor 274 is supplied with a B+ potential of approximately 8 volts and its base 282 to which the input radio frequency signal is applied through a condenser 284 is maintained at approximately 5.5 volts by a biasing network 286. As a consequence, the average potential appearing across the load resistor 276 is about 5 volts and since this voltage is applied to the collector 272 of the switcher transistor 270 and its base 273 is biased at about 4.5 volts by the prior conduction of the other switcher transistors, a potential of at least 5 volts on the base 268 is necessary to render the transistor 270 conductive, or in other words, "open the switch" for transmission of the radio frequency signal. The input radio frequency signal will appear across the load resistor 271 and will thereafter be delivered through a suitable coupling condenser 290 to the main reproduction circuit. The channel 3 pulse which renders its switcher 20 conductive appears in the G portion of FIG. 2 and it will be observed that when this switcher is turned "off," the channel 1 switcher 22 will be turned "on," followed in turn by the channel 4 and the channel 2 switchers 24 and 26. When such output are conjoined, a substantially continuous RF signal as appears in the H portion of FIG. 2 will be delivered to the main reproduction circuit.

From the foregoing, it will be apparent that many modifications can be made in the described circuit and the method carried out thereby without departing from the spirit of the present invention and the foregoing description of one embodiment is to be considered as purely exemplary and not in a limiting sense, and the actual scope of the invention is to be indicated only by reference to the appended claims.

What is claimed is:

1. The method of reproducing information recorded on magnetic video tape which comprises the steps of,
 deriving electrical information signals from overlapping information segments on the tape for transmission to video reproduction circuits through switch means,
 detecting the envelope of said information segments to provide a first signal in controlled response to the information segments,
 delaying the application of said first signal to said switch means by a predetermined fractional amount of said envelope,
 synchronously applying said first signal to said switch means for controlling the transmission of the information segments through said switch means to reproduction circuits.

2. The method of claim 1 wherein,
 the delaying step includes establishing a time reference signal for opening said switch means to said information segments.

3. The method of reproducing information according to claim 2 wherein
 the detection step includes the step of discriminating against signals below a predetermined amplitude level so that spurious responses are substantially eliminated.

4. The method of reproducing information according to claim 2 wherein
 the establishment of the time reference signal includes the step of
 generating a delay pulse beginning with the initial derivation of the information signal from the tape and terminating only after the signal derivation is sufficiently established to provide a high fidelity information signal.

5. The method of reproducing information according to claim 2 wherein
 the time reference signal is developed in response to the termination of the delay pulse.

6. The method of reproducing information according to claim 2 wherein
 the establishment of the time reference signal includes the steps of
 generating a series of synchronizing pulses to produce the time reference signal, and
 disabling the establishment of the time reference signal from a synchronizing pulse occuring during the duration of the delay pulse.

7. The method of reproducing information recorded on magnetic tape in the form of a plurality of sequential, overlapping information segments which comprise the steps of,
 separately deriving sequential, overlapping electrical information signals from the tape segments, to be transmitted to reproduction circuits through switch means,
 establishing in controlled response to the information signals a series of time reference signals, each delayed in time a predetermined fractional amount of a respective one of the plurality of derived information signals for application to said switch means,
 synchronously starting transmission of one information signal and simultaneously stopping transmission of the preceding information signal by using said time reference signal to open said switch means through to a common reproduction circuit thus to provide a substantially continuous output information signal.

8. Apparatus for reproducing information recorded on magnetic tape in the form of a plurality of sequential overlapping information segments which comprises,
 a multiple transducer arranged to derive separate sequential overlapping electrical information signals from the segments on the tape,
 a plurality of switch means connected to said transducer for separately receiving and transmitting the information signals,
 means for detecting separately each of said information signals to provide separate sequential, overlapping pulses,
 a time delay circuit arranged to receive all of said separate pulses and to generate a series of delay pulses whose leading edges correspond to the leading edges of overlapping pulses and whose length is a predetermined fraction of an overlapping pulse,
 a source of synchronizing pulses,
 a flip-flop circuit connected to said time delay circuit and to said switch means for control of said switch means,
 means connecting said time delay circuit to said source of synchronizing pulses in a manner to disable reception of a synchronizing pulse by said flip-flop circuit during a delay pulse wherein reception by said flip-flop of one of said overlapping pulses and a synchronizing pulse closes respective switch means in sequence for transmission of the sequential information signals therethrough.

References Cited

UNITED STATES PATENTS

| | | | |
|---|---|---|---|
| 2,996,576 | 8/1961 | Dolby. | |
| 3,109,989 | 11/1963 | Muir | 325—404 |

OTHER REFERENCES

Introduction to the theory of Switching Circuits, E. J. Clurkey, McGraw-Hill, Electronic Engineering Series, 1965.

ROBERT L. GRIFFIN, Primary Examiner

D. E. STOUT, Assistant Examiner

U.S. Cl. X.R.

179—100.2; 340—174.1